US010807233B2

(12) United States Patent
Dani et al.

(10) Patent No.: US 10,807,233 B2
(45) Date of Patent: Oct. 20, 2020

(54) SKILL TRANSFER FROM A PERSON TO A ROBOT

(71) Applicant: UNIVERSITY OF CONNECTICUT, Farmington, CT (US)

(72) Inventors: Ashwin Dani, Manchester, CT (US); Harish Ravichandar, Willimantic, CT (US)

(73) Assignee: THE UNIVERSITY OF CONNECTICUT, Farmington, CT (US)

( * ) Notice: Subject to any disclaimer, the term of this patent is extended or adjusted under 35 U.S.C. 154(b) by 224 days.

(21) Appl. No.: 15/659,881

(22) Filed: Jul. 26, 2017

(65) Prior Publication Data

US 2018/0029226 A1 Feb. 1, 2018

Related U.S. Application Data

(60) Provisional application No. 62/366,659, filed on Jul. 26, 2016.

(51) Int. Cl.
*G05B 19/04* (2006.01)
*G05B 19/18* (2006.01)
(Continued)

(52) U.S. Cl.
CPC .............. *B25J 9/161* (2013.01); *B25J 9/163* (2013.01); *B25J 9/1664* (2013.01);
(Continued)

(58) Field of Classification Search
CPC .......... B25J 9/161; B25J 9/163; B25J 9/1664; G05B 2219/39298; G05B 2219/40116;
(Continued)

(56) References Cited

U.S. PATENT DOCUMENTS 6,212,510 B1 * 4/2001 Brand ................ G06K 9/00342 706/12
9,008,840 B1 4/2015 Ponulak et al.
(Continued)

OTHER PUBLICATIONS

Khansari-Zadeh et al.; "Learning Control Lyapunov Function to Ensure Stability of Dynamical System-based Robot Reaching Motions"; Robotics and Autonomous Systems, vol. 62, No. 6 (2014); 15 pages.
(Continued)

*Primary Examiner* — Harry Y Oh
(74) *Attorney, Agent, or Firm* — Cantor Colburn LLP

(57) ABSTRACT

A computer-implemented method includes recording one or more demonstrations of a task performed by a user. Movements of one or more joints of the user are determined from the one or more demonstrations. By a computer processor, a neural network or Gaussian mixture model incorporating one or more contraction analysis constraints is learned, based on the movements of the one or more joints of the user, the one or more contraction analysis constraints representing motion characteristics of the task. A first initial position of a robot is determined. A first trajectory of the robot is determined to perform the task, based at least in part on the neural network or Gaussian mixture model and the first initial position.

18 Claims, 4 Drawing Sheets

(51) Int. Cl.

| | |
|---|---|
| ***B25J 9/16*** | (2006.01) |
| ***G06K 9/62*** | (2006.01) |
| ***G06N 7/00*** | (2006.01) |
| ***G06K 9/00*** | (2006.01) |
| ***G06K 9/78*** | (2006.01) |
| ***G06N 3/04*** | (2006.01) |
| ***G06N 3/08*** | (2006.01) |
| *G06N 3/00* | (2006.01) |

(52) U.S. Cl.
CPC ..... *G06K 9/00335* (2013.01); *G06K 9/00355* (2013.01); *G06K 9/6256* (2013.01); *G06K 9/78* (2013.01); *G06N 3/04* (2013.01); *G06N 3/08* (2013.01); *G06N 7/005* (2013.01); *G05B 2219/39298* (2013.01); *G05B 2219/40116* (2013.01); *G06N 3/008* (2013.01); *G06N 3/0481* (2013.01)

(58) Field of Classification Search
CPC ........ G06K 9/00335; G06K 9/78; G06N 3/04; G06N 3/08
See application file for complete search history.

(56) References Cited

U.S. PATENT DOCUMENTS

| | | | | |
|---|---|---|---|---|
| 9,092,698 | B2 | 7/2015 | Buehler et al. | |
| 10,061,876 | B2 * | 8/2018 | Mitra | G06F 17/13 |
| 2007/0255454 | A1 * | 11/2007 | Dariush | G06N 3/008 700/245 |
| 2009/0074252 | A1 * | 3/2009 | Dariush | G11C 11/5621 382/107 |
| 2009/0118863 | A1 * | 5/2009 | Dariush | B25J 9/1666 700/255 |
| 2009/0132088 | A1 | 5/2009 | Taitler | |
| 2011/0066283 | A1 * | 3/2011 | Hammam | B62D 57/032 700/250 |
| 2013/0151442 | A1 * | 6/2013 | Suh | G06N 3/008 706/12 |
| 2014/0277744 | A1 | 9/2014 | Coenen | |
| 2016/0048375 | A1 * | 2/2016 | Balkan | G06F 8/20 717/104 |
| 2018/0329112 | A1 * | 11/2018 | Lee | E21B 49/08 |

OTHER PUBLICATIONS

Khansari-Zadeh et al.; "Learning Stable Nonlinear Dynamical Systems With Gaussian Mixture Models"; IEEE Transactions on Robotics, vol. 27, No. 5; Oct. 2011; 15 pages.

Kronander et al.; "Learning Compliant Manipulation through Kinesthetic and Tactile Human-Robot Interaction"; IEEE Transactions on Haptics, vol. 7, No. 3; Jul. 2014; 16 pages.

Momi et al.; "A Neural Network-Based Approach for Trajectory Planning in Robot-Human Handover Tasks"; In: Frontiers in Robotics and AI, Jun. 27, 2016, doi: 10.3389/frobt.2016.00034; p. 3, paragraphs 2-4; p. 4, paragraphs 2,4,5, 8; )(2016).

PCT International Search Report and Written Opinion (ISRWO); Application No. PCT/US17/43889; dated Oct. 6, 2017; 16 pages.

Ravichandar et al.; "Human Intention Inference Through Interacting Multiple Model Filtering"; In: 2015 IEEE International Conference on Multisensor Fusion and Integration for Intelligent Systems (MFI) Sep. 14-16, 2015, San Diego, CA, USA, DOI: 10.1109/MFI.2015.7295812; pp. 220-225.

Rossano et al.; "Easy robot programming concepts: An industrial perspective (Abstract Only)"; 2013 IEEE International Conference on Automation Science and Engineering (CASE); 1 page.

Schaal; "Is Imitation Learning the Route to Humanoid Robots?" Trends in Cognitive Sciences 3 (1999); 19 pages.

Lohmiller, W. et al. "On Contraction Analysis for Nonlinear Systems", Nonlinear Systems Laboratory, Massachusetts Institute of Technology, Room 3-338, Cambridge, Massachusetts, 02139, USA. Oct. 1996. Revised, Aug. 1997. Final version, Dec. 1997, 27 Pages.

Ravichandar, H. et al. "Bayesian Human Intention Inference Through Multiple Model Filtering with Gaze-based Priors", 19th International Conference on Information Fusion, Heidelberg, Germany. Jul. 5-8, 2016. 7 Pages.

Ravichandar, H. et al. "Human Intention Inference and Motion Modeling using Approximate E-M with Online Learning", 2015 IEEE/RSJ International Conference on Intelligent Robots and Systems (IROS) Congress Center Hamburg. Sep. 28-Oct. 2, 2015. Hamburg, Germany. pp. 1819-1824.

Ravichandar, H. et al. "Human Intention Inference through Interacting Multiple Model Filtering", 2015 IEEE International Conference on Multisensor Fusion and Integration for Intelligent Systems (MFI), Sep. 14-16, 2015. San Diego, CA, USA. pp. 220-225.

Ravichandar, H. et al. "Human Intention Inference Using Expectation-Maximization Algorithm With Online Model Learning", IEEE Transactions on Automation Science and Engineering, vol. 14, No. 2, Apr. 2017. pp. 855-868.

Ravichandar, H. et al. "Learning Partially Contracting Dynamical Systems from Demonstrations", Proceedings of Machine Learning Research, vol. 78. 2017. pp. 369-378.

Ravichandar, H. et al. "Learning Periodic Motions from Human Demonstrations using Transverse Contraction Analysis", 2016 American Control Conference (ACC), Jul. 6-8, 2016. Boston, MA, USA. pp. 4853-4858.

Ravichandar, H. et al. "Learning Stable Nonlinear Dynamical Systems with External Inputs using Gaussian Mixture Models", 2018 Annual American Control Conference (ACC), Jun. 27-29, 2018. Wisconsin Center, Milwaukee, USA. pp. 4825-4830.

Ravichandar, H et al. "Learning Contracting Nonlinear Dynamics From Human Demonstration for Robot Motion Planning", Proceedings of the ASME 2015 Dynamic Systems and Control Conference, Oct. 28-30, 2015, Columbus, OH, USA, 8 Pages.

* cited by examiner

SKILL TRANSFER FROM A PERSON TO A ROBOT

CROSS-REFERENCE TO RELATED APPLICATIONS

The present application claims priority to U.S. Provisional Application No. 62/366,659, filed on Jul. 26, 2016, the contents of which are incorporated by reference herein in their entirety.

BACKGROUND

Embodiments relate to robotics and, more specifically, to skill transfer from a person to a robot.

Learning from demonstration is an important problem in the context of training robots using non-expert operators, i.e., operators who are not equipped to reprogram the robots. For instance, to teach a task to a robot, the robot can be given the ability to learn motion from demonstrations of the task performed by a user. Thus, the user, despite being a non-expert operator, can teach the task to the robot by demonstrating the task. This technique may enable robots to perform, for example, in manufacturing contexts or as assistants to the elderly.

SUMMARY

According to an embodiment of this disclosure, a computer-implemented method includes recording one or more demonstrations of a task performed by a user. Movements of one or more joints of the user are determined from the one or more demonstrations. A neural network or Gaussian mixture model incorporating one or more contraction analysis constraints is learned by a computer processor based on the movements of the one or more joints of the user. The one or more contraction analysis constraints represent motion characteristics of the task. A first initial position of a robot is determined. A first trajectory of the robot to perform the task is determined based, at least in part, on the neural network or Gaussian mixture model and the first initial position.

In another embodiment, a system includes a memory having computer readable instructions and one or more processors for executing the computer readable instructions. The computer readable instructions include recording one or more demonstrations of a task performed by a user. Further according to the computer readable instructions, movements of one or more joints of the user are determined from the one or more demonstrations. A neural network or Gaussian mixture model incorporating one or more contraction analysis constraints is learned, based on the movements of the one or more joints of the user. The one or more contraction analysis constraints represent motion characteristics of the task. A first initial position of a robot is determined. A first trajectory of the robot to perform the task is determined based, at least in part, on the neural network or Gaussian mixture model and the first initial position.

In yet another embodiment, a computer program product for transferring a skill to a robot includes a computer readable storage medium having program instructions embodied therewith. The program instructions are executable by a processor to cause the processor to perform a method. The method includes recording one or more demonstrations of a task performed by a user. Further according to the method, movements of one or more joints of the user are determined from the one or more demonstrations. A neural network or Gaussian mixture model incorporating one or more contraction analysis constraints is learned, based on the movements of the one or more joints of the user. The one or more contraction analysis constraints represent motion characteristics of the task. A first initial position of a robot is determined. A first trajectory of the robot to perform the task is determined based, at least in part, on the neural network or Gaussian mixture model and the first initial position.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE DRAWINGS

The subject matter regarded as the invention is particularly pointed out and distinctly claimed in the claims at the conclusion of the specification. The foregoing and other features and advantages of the invention are apparent from the following detailed description taken in conjunction with the accompanying drawings in which:

DETAILED DESCRIPTION

Some embodiments of this disclosure are learning systems that are based on a method of contracting dynamic system primitive (CDSP). Using CDSP, the learning system may learn motion dynamics, specifically a complex human motion dynamic model, using a neural network (NN) or a Gaussian mixture model (GMM) subject to motion trajectory constraints of a task, such as a reaching task. According to some embodiments, a human arm's reaching motion is modeled using a dynamic system (DS) $\dot{x}=f(x)$, where $f(x)$ is represented using a NN or GMM that is learned based on one or more demonstrations of the task by a human user.

In some embodiments, the problem of learning motion dynamics is formulated as a parameter learning problem of a NN or GMM under stability constraints given by contraction analysis of nonlinear systems. The contraction analysis may yield global exponential stability, in the form of a globally semi-contracting or partially contracting function, of the nonlinear systems.

There may be various benefits to learning a globally semi-contracting or partially contracting function in this context. For instance, motion trajectories may converge to a goal location from various initial conditions. Thus, regardless of the initial conditions when a robot performs a task, the robot may reach the desired goal location. A further benefit may be that, with the addition of an obstacle avoidance feature, trajectories generated for the robot may still converge to the goal location in the existence of obstacles.

Figure 1:
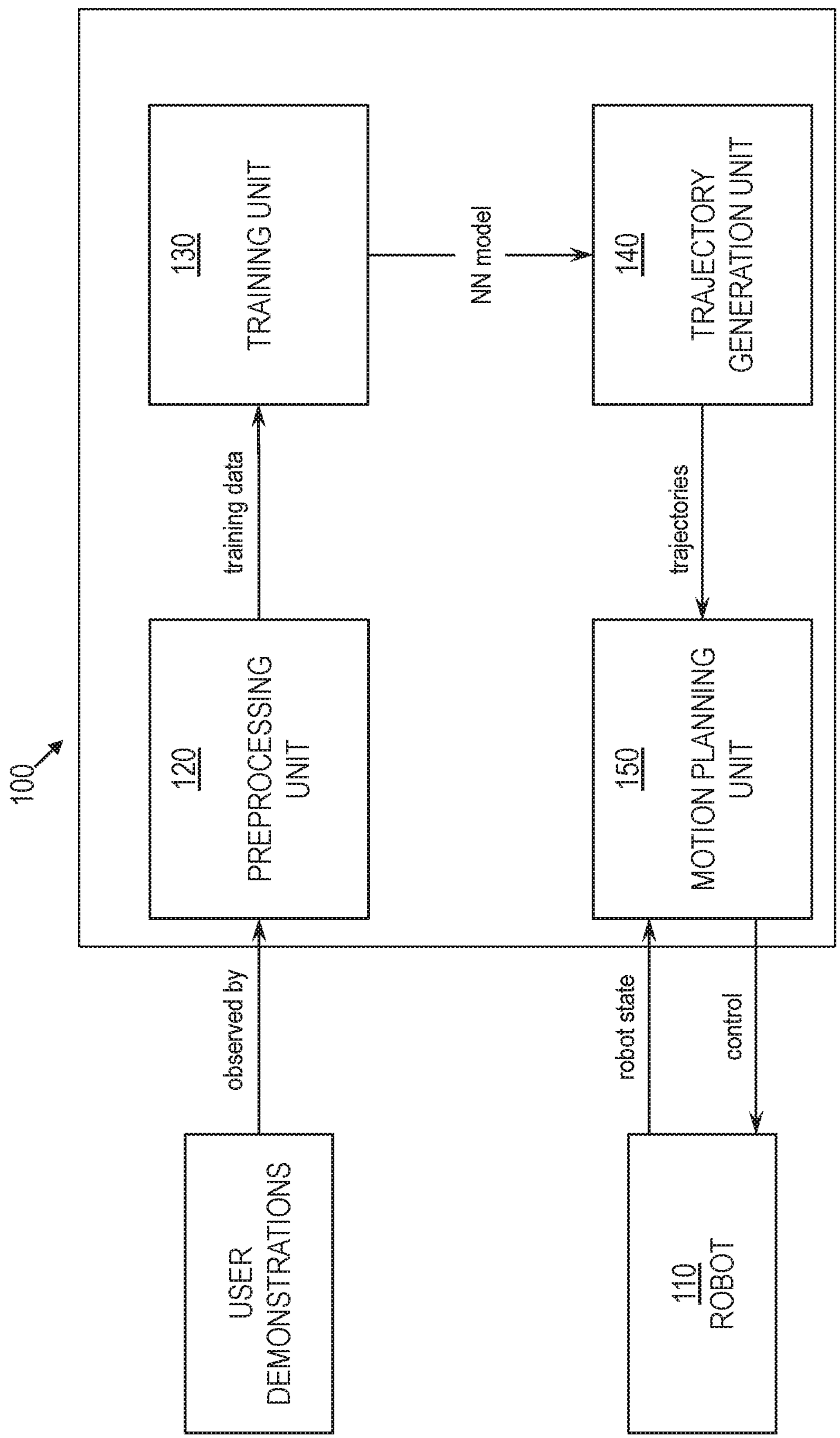
FIG. 1 is a block diagram of a learning system used to control a robot, by learning a skill through one or more user demonstrations of a task, according to one or more embodiments of this disclosure.

FIG. 1 is a block diagram of a learning system 100 used to control a robot 110, by learning a skill through one or more user demonstrations, according to one or more embodiments of this disclosure. As shown, the learning system 100 may include a preprocessing unit 120, a training unit 130, a trajectory generation unit 140, and a motion planning unit 150. Generally, the preprocessing unit 120 may observe one or more demonstrations of a task performed by a user and may perform preprocessing tasks, such as obtaining position, velocity, and acceleration of the human's movements in performing the task; the training unit 130 may define parameters of the NN or GMM and may obtain weights for the NN or GMM; the trajectory generation unit 140 may observe a state of the robot and generate a trajectory enabling the robot to perform the task, based on the NN or GMM; and the motion planning unit 150 may apply the trajectory to the robot 110, thus causing the robot 110 to perform the task. The preprocessing unit 120, training unit 130, trajectory generation unit 140, and motion planning unit 150 may include hardware, software, or a combination of both. Further, although these units are illustrated as separate in FIG. 1, one of skill in the art will understand that they may share hardware, software, or both.

In some embodiments, as will be described further below, the learning system 100 may formulate an optimization problem, which may be used to compute weights of the NN or GMM subject to one or more contraction conditions of underlying dynamics. One or more contraction constraints may yield a state-dependent matrix inequality condition (i.e., a contraction inequality constraint), which may be nonconvex in the weights of the NN or GMM. In the case of a NN, the contraction inequality constraint may be reformulated as linear inequality conditions (i.e., linear inequality constraints) by assuming that a contraction metric is a constant and the number of neurons in a hidden layer of the NN is equal to the number of inputs. In the case of a GMM, the contraction inequality constraint may be reformulated as a polynomial matrix inequality constraint by assuming that the elements of a contraction metric are polynomial functions in the state.

Further, in some embodiments, the learning system 100 may use sequential quadratic programming (SQP), in a novel learning algorithm, subject to the relaxed contraction constraints. The learning system 100 may select good initial conditions for the constrained SQP based on the solutions obtained by solving an unconstrained optimization problem first.

In some embodiments, as will also be described further below, the CDSP method may be enhanced with an obstacle avoidance strategy by using a gradient of a repulsive potential function. Because the semi-contracting or partially contracting trajectories being modeled are globally converging to a goal location (i.e., the location of an object being reached for), the addition of local repulsive potential need not change attractor behavior at the goal location.

Further, because the demonstrations are not directly performed by moving the robot arm, some robots may not be able to follow the parts of trajectories generated by the learned dynamics. To circumvent this problem, a low-level motion planning algorithm or inverse kinematics may be used for implementation of the trajectories generated by the learned model on a specific robot platform.

In some embodiments, CDSP is robust to abrupt changes in trajectories that may appear due to disturbances, such as sensor failures or malfunctioning of the robot 110. The learned motion model may recreate paths that converge to the goal locations in spite of such disturbances. Another other advantage of CDSP, in some embodiments, is that the trajectories may be learned based on a single demonstration, although learning paths based on multiple demonstrations can be beneficial, especially in the case of a bad single demonstration.

Figure 2:
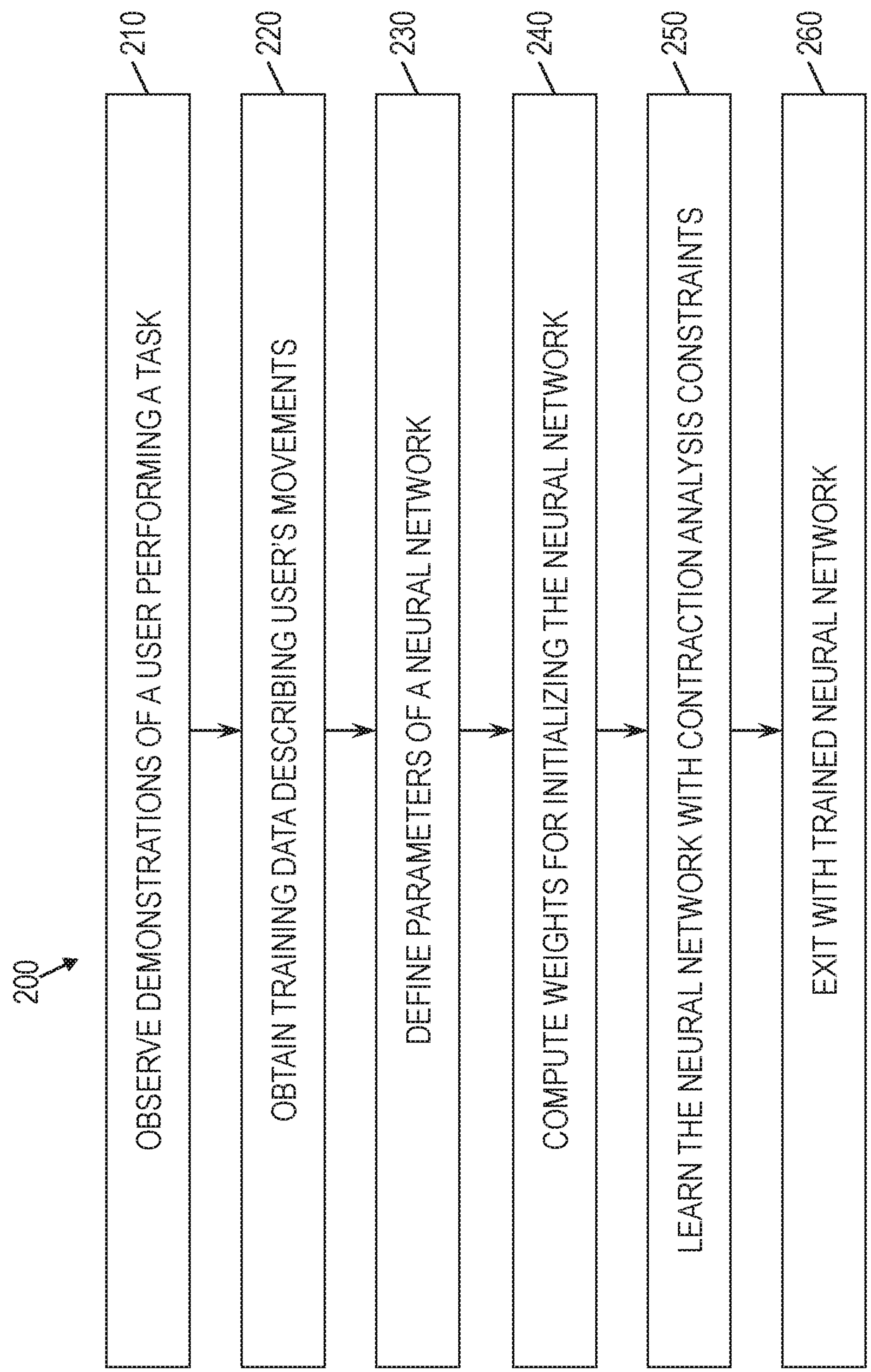
FIG. 2 is a flow diagram of a method for learning semi-contracting or partially contracting nonlinear dynamics from the one or more demonstrations for the purpose of robot motion planning, according to one or more embodiments of this disclosure.

FIG. 2 is a flow diagram of a method 200 of learning semi-contracting or partially contracting nonlinear dynamics from one or more demonstrations for the purpose of robot motion planning, according to one or more embodiments of this disclosure.

As shown, at block 210, the learning system 100 may observe one or more demonstrations of a user performing a task. For example, and not by way of limitation, the task may be a reaching task, such as for loading or unloading a dishwasher, placing food in a microwave, opening a door, or picking up something. In some embodiments, this may include recording joint positions of the user, which may be done with a three-dimensional (3D) video camera such as Microsoft® Kinect® for Windows®. At block 220, the learning system 100 may obtain training data describing the user's movements when performing the demonstrations. For example, and not by way of limitations, this training data may include estimates of position, velocity, and acceleration of the user's hand, joints, or other body part. In other words, the learning system 100 may determine positions and movements of the user based on the demonstrations. In some embodiments, the estimates may be obtained by computing them through application of a local Kalman filter to the joint positions of the user.

For encoding motions of the demonstrations, there may exist a state variable $x(t)=[p(t)^T, v(t)^T]^T\in\mathbb{R}^{2d}$, where $p(t)\in\mathbb{R}^d$ is the position and $v(t)\in\mathbb{R}^d$ is the velocity of a point in d dimensions at time t. Let a set of N demonstrations $\{D_i\}_{i=1}^N$ be a set of solutions to the dynamic model $\dot{x}(t)=f(x(t))$, where $f: \mathbb{R}^{2d}\rightarrow\mathbb{R}^d$ is a nonlinear, continuously differentiable, autonomous function. Each demonstration may correspond to a reaching motion ending at $x^*=[g^T, 0_{1\times d}]^T$, where $g\in\mathbb{R}^d$ is the goal location. Each demonstration may be associated with a set of trajectories of the states $\{x(t)\}_{t=1}^{t=T}$ and a set of trajectories of the state derivatives $\{\dot{x}(t)\}_{t=1}^{t=T}$ from time t=0 to t=T.

In the case of point-to-point reaching motions, the trajectories of a human hand can start from various initial locations and end at the goal location. Additionally, in some embodiments, the velocity and acceleration is zero at the goal location.

In some embodiments, the preprocessing unit 120 may perform blocks 210-220 of the method 200.

At block 230, the learning system 100 may define parameters of a NN or GMM to be used as a model. These parameters may define a structure for the NN or GMM and may include, for example, the number of neurons in the hidden layer of the NN or a number of Gaussians in the GMM. The parameters may vary based on implementation and may be a design choice. For instance, as the number of neurons in the hidden layer increases, the learning system 100 may take longer to compute trajectories for the robot 110, but the trajectories may be more precise and may thus result in improved performance of the task by the robot 110.

At block 240, the learning system 100 may compute weights for initializing the NN or GMM without constraints, based at least in part on the training data.

As discussed above, the learning system 100 may utilize contraction analysis to analyze exponential stability of nonlinear systems. A non-linear, non-autonomous system may have the form $\dot{x}=f(x,t)$ (hereinafter "Formula 1"), where $x(t)\in\mathbb{R}^n$ is a state vector, and $f: \mathbb{R}\rightarrow\mathbb{R}^n$ is a continuously differentiable nonlinear function. In this case, the relation $$\delta\dot{x} = \frac{\partial f(x,t)}{\partial x}$$

$\delta x$ holds, where $\delta x$ is an infinitesimal virtual displacement in fixed time. The squared virtual displacement between two trajectories of Formula 1 in a symmetric, uniformly positive definite metric $M(x,t)\in\mathbb{R}^{n\times n}$ may be given by $\delta x^T M(x,t)\delta x$, and its time derivative may be given by $$\frac{d}{dt}(\delta x^T M(x,t)\delta x) = \delta x^T\left(\frac{\partial f^T}{\partial x}M(x,t) + \dot{M}(x,t) + M(x,t)\frac{\partial f}{\partial x}\right)\delta x.$$

If the inequality $$\frac{\partial f^T}{\partial x}M(x,t) + \dot{M}(x,t) + M(x,t)\frac{\partial f}{\partial x} \leq 0\forall t,$$

$\forall x$ is satisfied, then the system of Formula 1 may be deemed to be semi-contracting. Further, the trajectory of Formula 1 may converge to a single trajectory regardless of initial conditions.

If the inequality $$\frac{\partial f^T}{\partial x}M(x,t) + \dot{M}(x,t) + M(x,t)\frac{\partial f}{\partial x} \leq -2\gamma M(x,t), \forall t,$$

$\forall x$ is satisfied for a strictly positive constant $\gamma$, then the system of Formula 1 may be deemed to be contracting with the rate $\gamma$. Further, the trajectory of Formula 1 may converge to a single trajectory regardless of initial conditions.

For an auxiliary system of the form $\dot{y}=f(y,x,t)$ (hereinafter "Formula 2"), where $y(t)\in\mathbb{R}^n$ is an auxiliary variable, if the inequality $$\frac{\partial f^T}{\partial y}M(y,t) + \dot{M}(y,t) + M(y,t)\frac{\partial f}{\partial y} \leq -2\gamma M(y,t), \forall t,$$

$\forall y$ is satisfied for a strictly positive constant $\gamma$, then the auxiliary system of Formula 2 may be deemed to be contracting and the system of Formula 1 may be deemed to be partially contracting. Further, if any particular solution of the auxiliary system of Formula 2 verifies a smooth specific property, then all the trajectories of the system of Formula 1 verify this specific property exponentially.

In some embodiments, a set of N demonstrations $\{D_i\}_{i=1}^N$ performed by the user are solutions to an underlying dynamic model governed by the first-order differential equation $\dot{x}(t)=f(x(t))$ (hereinafter "Formula 3"), where the state variable $x\in\mathbb{R}^n$, and $f: \mathbb{R}\rightarrow\mathbb{R}^n$ is a nonlinear continuous and continuously differentiable function.

Each demonstration may include trajectories of the states $\{x(t)\}_{t=1}^{t=T}$ and trajectories of the state derivatives $\{\dot{x}(t)\}_{t=1}^{t=T}$ from time t=0 to t=T. Because the state trajectories of the demonstrations of a specific stable DS may exponentially converge to a single trajectory or a single point (i.e., the goal location), the system defined in Formula 3 may be considered a globally contracting system.

In some embodiments of the learning system 100, the nonlinear function f is modeled using a NN given by $f(x(t))=W^T\sigma(U^T s(t)+\in(s(t))$ (hereinafter "Formula 4"). In Formula 4, $s(t)=[x(t)^T, 1]^T\in\mathbb{R}^{n+1}$ is an input vector to the NN;

$$\sigma(U^T s(t)) = \left[\frac{1}{1+\exp((-U^T s(t))_1)}, \cdots \frac{1}{1+\exp((-U^T s(t))_i)}, \cdots \frac{1}{1+\exp\left((-U^T s(t))_{n_h}\right)}\right]^T$$

is a vector-sigmoid activation function, and $(U^T s(t))_i$ is the $i^{th}$ element of the vector $(U^T s(t), U\in\mathbb{R}^{(n+1)\times n_h}$; the elements of $W\in\mathbb{R}^{n_h\times n}$ are bounded constant-weight matrices; $\in(s(t))\in\mathbb{R}^n$ is a function reconstruction error that goes to zero after the NN is fully trained; and $n_h$ is the number of neurons in the hidden layer of the NN.

In some embodiments of the learning system 100, the nonlinear function f is modeled using a GMM given by $f(x(t))=\Sigma_k h_k(x(t))(A_k x(t)+b_k)+\in(x(t))$ (hereinafter "Formula 5"). In Formula 5, $$h_k(x(t)) = \frac{p(k)p(x\mid k)}{\Sigma_k p(k)p(x\mid k)}$$

is the scalar weight associated with the kth Gaussian such that $\Sigma_k h_k(x(t))=1$ and $0\leq h_k(x(t))\leq 1$, p(k) is the prior probability, and $$A_k = \Sigma_{k_{\dot{x}x}}(\Sigma_{k_x})^{-1},\ b_k = \mu_{k_{\dot{x}}} - A_k\mu_{k_x},\ \mu_k = \left[\mu_{k_x}^T, \mu_{k_{\dot{x}}}^T\right]^T \text{ and}$$

$$\Sigma_k = \begin{bmatrix} \Sigma_{k_x} & \Sigma_{k_{\dot{x}x}} \\ \Sigma_{k_{\dot{x}x}} & \Sigma_{k_{\dot{x}}} \end{bmatrix}$$

are the mean and covariance of the kth Gaussian, respectively.

Given the one or more demonstrations, the learning system 100 may learn the function f, which is modeled using a NN or GMM under contraction conditions. This may enable the learning system 100 to generate converging trajectories, governed by a stable DS and starting from a given arbitrary initial condition. As a result, the learning system 100 may cause the robot 110 to execute such a trajectory, by performing the task demonstrated in the one or more demonstrations, given arbitrary initial conditions.

In some embodiments, the constrained optimization problem to be solved by the learning system 100 to train the semi-contracting NN may be $\{\hat{W},\hat{U}\}=\text{argmin}_{W,U}\{\alpha E_D+\beta E_W\}$ (hereinafter "Formula 6"), such that $$\frac{\partial f^T}{\partial x}M + M\frac{\partial f}{\partial x} \leq 0,$$

$M>0$ (hereinafter "Formula 7"). In Formula 6 and Formula 7, $E_D=\Sigma_{i=1}^N[y_i-a_i]^T[y_i-a_i]$ may be the sum of squared errors; $a_i\in\mathbb{R}^n$ and $y_i\in\mathbb{R}^n$ may respectively represent the end location and the NN's output corresponding to the ith demonstration; $E_W$ may be the sum of the squares of the NN weights; $\alpha$ and $\beta$ may be parameters of regularization; and $M \in \mathbb{R}^{n \times n}$ may represent a constant positive symmetric matrix. The learning system may compute the Jacobian $$\frac{\partial f}{\partial x} \text{ as } \frac{\partial f}{\partial x} = W^T \frac{\partial \sigma(U^T s)}{\partial x} = W^T [\Sigma'(U^T s)] U_x^T.$$

In the above, for any $b \in \mathbb{R}^{n_h}$, $\Sigma'(b) \in \mathbb{R}^{n_h \times n_h}$ may be a diagonal matrix given by $\Sigma'(b)=\text{diag}(\sigma(b_1)(1-\sigma(b_1)), \sigma(b_2)(1-\sigma(b_2)), \ldots, \sigma(b_p)(1-\sigma(b_{n_h})))$ (hereinafter "Formula 8"); and $U_X \in \mathbb{R}^{n \times n_h}$ may be a sub-matrix of U formed by taking the first n rows of U.

In some embodiments, the constrained optimization problem to be solved by the learning system 100 to train the partially contracting GMM may be $\{\hat{\theta}_G\}=\text{argmin}_{\theta_G}\{\alpha E_D+\beta E_W\}$ (hereinafter "Formula 9"), such that $$\frac{\partial f^T}{\partial x} M(y) + \dot{M}(y, t) + M(y) \frac{\partial f}{\partial y} \leq 0,\ M(y) > 0,\ A_k x^* + b_k = 0,\ \forall\ y, k$$

(hereinafter "Formula 10"), where x* is the desired equilibrium point of the GMM. In Formula 9 and Formula 10, $E_D=\Sigma_{i=1}^N[y_i-a_i]^T[y_i-a_i]$ may be the sum of squared errors; $a_i \in \mathbb{R}^n$ and $y_i \in \mathbb{R}^n$ may respectively represent the end location and the GMM's output corresponding to the ith demonstration; $E_W$ may be the sum of the squares of the GMM parameters; $\alpha$ and $\beta$ may be parameters of regularization; and $M(y) \in \mathbb{R}^{n \times n}$ may represent a uniformly positive symmetric matrix.

Formula 7 and Formula 10 are examples of contraction constraints incorporated into the learning process of the learning system 100. They are derived from contraction theory, which studies the behavior of trajectories. This constraint on the Jacobian, which is the first order derivative of the function f with respect to the state, may ensure that all the trajectories learned will converge to the goal location as well as achieve zero velocity at the goal location regardless of initial conditions.

At block 250, based on the initialization of the NN or GMM in block 240, the learning system 100 may learn the NN or GMM with contraction analysis constraints. Constraints may embody motion characteristics, or motion limitations, of the task that was demonstrated. For example, and not by way of limitation, if the task is a reaching task, the user's hand likely reached a specific velocity (e.g., a zero velocity) at the object being reached for during the demonstrations, and if the task is polishing a table, the task likely includes some periodicity as the user rubbed the table in a circular motion. In some embodiments, learning with contraction analysis constraints may be achieved by solving an optimization problem, as described below.

The optimization problem defined in Formula 6 and Formula 7 above can be rewritten as $\{\hat{W},\hat{U}\}=\text{argmin}_{W,U}\{\alpha\Sigma_{i=1}^N[y_i-a_i]^T[y_i-a_i]^T[y_i-a_i]+\beta(\text{tr}(W^TW)+\text{tr}(U^TU))\}$ (hereinafter "Formula 11"), such that $U_x[\Sigma'(U^Ts)]^TWM+MW^T[\Sigma'(U^Ts)]U_x^T \geq 0$, $M>0$ (hereinafter "Formula 12").

As shown below, the nonconvex constraints of Formula 12 can be relaxed to LMI constraints, which may be used by the learning system 100 to update the NN. It can be shown that the constraints defined in Formula 12 may be always satisfied if the following constraints are satisfied: $n=n_h$, $U_x>0$, $W<0$, $M>0$ (hereinafter "Formula 13").

The sigmoid function $\sigma(\ )$ is in the range [0,1], and thus the derivative of $\sigma(\ )(1-\sigma(\ ))$ may have upper and lower bounds given by $0 \leq \sigma(\ )(1-\sigma(\ )) \leq 0.25$ (hereinafter "Formula 14"). Using Formula 14 and the fact that $\Sigma'(\ )$ is given by Formula 8, each diagonal element of the matrix $\Sigma'(U^Ts)$ may be lower bounded by 0. The lower bound of the whole matrix may be given by $E'(U^Ts) \geq 0$ (hereinafter "Formula 15"). Multiplying $MW^T$ on the left and $U_x^T$ on the right of Formula 15 yields $MW^T[\Sigma(U^Ts)]U_x^T \geq 0$ (hereinafter "Formula 16") and $U_x[\Sigma'(U^Ts)]^TWM \leq 0$ (hereinafter "Formula 17").

Given Formula 16 and Formula 17, $U_x[\Sigma'(U^Ts)]^TWM$ may be upper bounded as $U_x[\Sigma'(U^Ts)]^TWM+MW^T[\Sigma'(U^Ts)]U_x^T \leq 0$ (hereinafter "Formula 18"). If the constraints defined in Formula 13 hold, as presumed above, then Formula 13 and Formula 18 together may yield $U_x[\Sigma'(U^Ts)]^TWM+MW^T[\Sigma'(U^Ts)]U_x^T \leq 0$ (hereinafter "Formula 19"). Thus, the constraint of Formula 12, being equal to Formula 19, may be satisfied where Formula 13 is true.

As shown below, the optimization problem defined in Formula 9 and Formula 10 above can be rewritten as $\{\hat{W},\hat{U}\}=\text{argmin}_{W,U}\{\alpha\Sigma_{i=1}^N[y_i-a_i]^T[y_i-a_i]+\beta E_W\}$ (hereinafter "Formula 20"), such that $A_k^TM(y)+\dot{M}_k(y)+M(x)A_k \leq -\gamma M(y)$, $M(y)>0$, $A_kx^*+b_k=0$, $\forall y, k$ (hereinafter "Formula 21"), where the ijth element of the matrix $\dot{M}_k(y)$ is given by $$\dot{M}_{k_{ij}}(y) \triangleq \frac{dM_{ij}(y)}{dy}(A_k y + b_k).$$

Given the Jacobean $$\frac{\partial f}{\partial y} \triangleq \Sigma_k\{h_k(x)A_k\}$$

and the decomposition of the contraction metric $\dot{M}(y)=\Sigma_k h_k(x) M_k(y)$, Formula 10 can be rewritten as $\Sigma_k h_k(x)\{A_k^TM_k(y)+\dot{M}_k(y)+M(x)A_k\} \leq -\gamma M(y)$, $M(y)>0$, $A_kx^*+b_k=0$, $\forall y, k$ (hereinafter "Formula 22"). Using the facts $\Sigma_k h_k(x(t))=1$ and $0 \leq h_k(x(t)) \leq 1$, it may be shown that Formula 10 is satisfied where Formula 21 is satisfied. Note that, during implementation, in some embodiments, the constraint in Formula 21 may be evaluated at x since the GMM is partially contracting and the trajectories y(t) and x(t) converge to each other exponentially.

Note that, in some embodiments, Formula 21 depends on the state variable and must be enforced at every point in the state space, rendering the optimization problem intractable in practice. As shown below, the above noted state-dependence issue of the condition in Formula 21 may be overcome by rewriting it as $\overline{G}_k \leq 0$, $A_kx^*+b_k=0$, $\forall k$ (hereinafter "Formula 23").

On defining the matrices $G_k \triangleq A_k^TM(y)+\dot{M}_k(y)+M(x)A_k+\gamma M(y)$, the condition in Formula 21 may be rewritten as $z^TG_kz \leq 0$, $\forall z$, where $z \in \mathbb{R}^n$ is a vector of indeterminates. By the way of sum of squares decomposition, it can be shown that $z^TG_kz=m(x,z)^T\overline{G}_km(x,z)$, where $m(x,z) \in \mathbb{R}^{\overline{n}}$, is a vector of monomials in the elements of x and z; the elements of the matrix $\overline{G}_k$ are polynomials in the elements of the unknown parameters and may be obtained by coefficient matching.

Blocks 230-250, described above, may be performed by the training unit 130 in some embodiments. At block 260, the method 200 may exit, having trained the NN with contraction analysis constraints.

Figure 3:
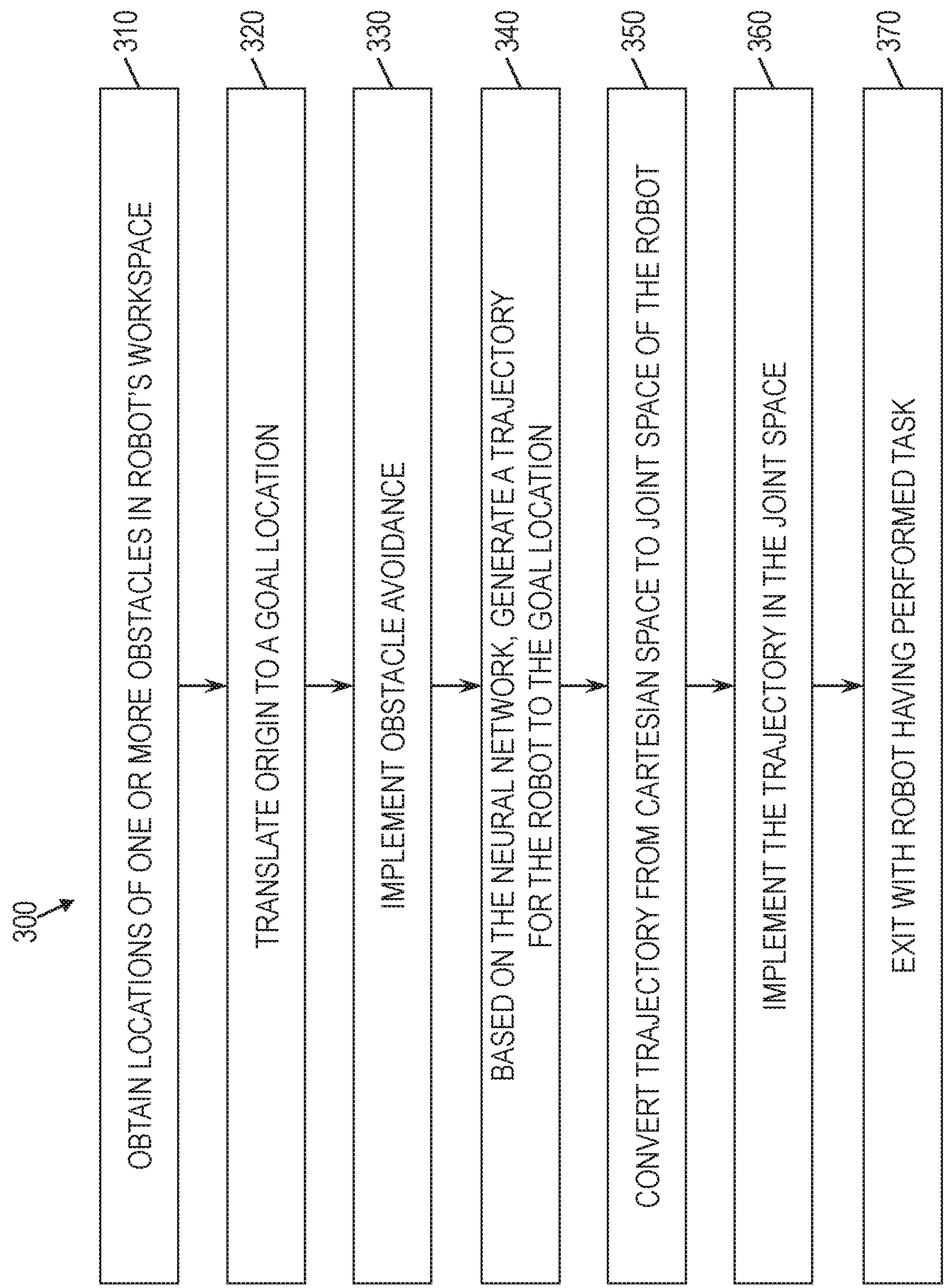
FIG. 3 is a flow diagram of a method for causing a robot to perform the task, according to one or more embodiments of this disclosure.

FIG. 3 is a flow diagram of a method 300 for causing a robot to perform the task, according to one or more embodiments of this disclosure. This method 300 may be executed by the learning system 100 after having executed the method 200 of FIG. 2.

The trajectory generated by the semi-contracting NN or the partially contracting GMM defined above does not take obstacles into consideration. In other words, the feedback being considered by the NN or GMM of the learning system 100, as described above, may be only the current state of the robot 110. However, some embodiments of the learning system 100 may also execute obstacle avoidance in performing reaching tasks.

To this end, at block 310, the learning system 100 may obtain locations of one or more obstacles $o_i$ in a workspace of the robot 110; an initial location of an end effector x(0) (e.g., a point on the robot's hand) intended to reach the goal location, to be treated as an origin; and the goal location $x_d$ of the end effector. At block 320, the learning system 100 may translate the origin to the goal location. In some embodiments, the learned NN or GMM generates trajectories to the origin. Thus, this translation may be performed to generate trajectories to the goal location instead. Blocks 310-320 may be implemented by various means known in the art.

At block 330, the learning system 100 may implement obstacle avoidance.

In some embodiments, implementing obstacle avoidance includes computing a size of a domain of influence $D_i^*$ for each obstacle. For instance, the learning system 100 may use an artificial repulsive potential field in the workspace of the robot 110, in addition to the semi-contracting dynamics learned above. The repulsive potential $V_r$ for the $i^{th}$ obstacle and the origin may be given by $$V_{ri}(x) = \begin{cases} \frac{1}{2}\eta\left(\frac{1}{d_i(x)} - \frac{1}{D_i^*}\right)^2, \ d_i(x) \le D_i^* \\ 0, \ d_i(x) > D_i^* \end{cases}. \quad \text{(hereinafter "Formula 24")}$$

The gradient of Formula 24 with respect to a current state x of the robot 110 may be given by $$\nabla_x V_{ri}(x) = \begin{cases} \eta\left(\frac{1}{D_i^*} - \frac{1}{d_i(x)}\right)\frac{1}{d_i^2}\nabla_x d_i(x), \ d_i(x) \le D_i^* \\ 0, \ d_i(x) > D_i^* \end{cases}. \quad \text{(hereinafter "Formula 25")}$$

In the above, $d_i = \|x - o_i\|_2$ may be the Euclidean distance from x to the location of the $i^{th}$ obstacle $o_i$; $D_i^*$ may be the size of a domain of influence of the $i^{th}$ obstacle; $\eta \in \mathbb{R}^+$ may be a positive constant; and $\nabla_x d_i(x)$ may denote the derivative of $d_i(x)$ with respect to x.

In some embodiments, the negative gradient of Formula 24, given by the negative of Formula 25 results in a repulsive force acting on the robot 110. The repulsive force may drive the robot 110 away from the obstacles and can thus be viewed as a force that acts along with an attractive force to drive the robot 110 to the goal location. The attractive force may be provided by the semi-contracting NN or the partially contracting GMM. Thus, where $n_0$ is the number of obstacles to be avoided, the combined dynamics $f_c(\ )$ may be described by $\dot{x} = f_c(x(t)) = f(x(t)) - \Sigma_i \nabla_x V_{ri}(x(t))$, for $i = \{1, \ldots, n_0\}$ (hereinafter "Formula 26").

In some embodiments, implementing obstacle avoidance may involve use of a differential equation that models the obstacle avoidance. According to a study of human behavioral dynamics, an additional term for $n_0$ obstacles causes a change in acceleration that is given by $f_{obs}$ as follows:

$$f_{obs} = (x(t)) = \gamma \sum_{i=1}^{n_0} R(t) v(t) \varphi_i(t) \exp(-\beta \varphi_i(t))$$

where γ and β are positive scalar constants;

$$\varphi_i(t) = \cos^{-1}\left(\frac{(o_i - p(t))^T v(t)}{\|o_i - p(t)\| \|v(t)\|}\right)$$

is the steering angle between $(o_i - p(t)$ and v(t); $o_i$ is the position of the $i^{th}$ obstacle; R(t) is the rotation matrix that defines a ninety-degree rotation about the axis $r(t) = (o_i - p(t) \times v(t)$. Thus, the combined dynamics $f_c(\ )$ are described by $$\dot{x}(t) = f_c(x(t)) = f(x(t)) + \begin{bmatrix} 0_{d \times 1} \\ f_{obs}(x(t)) \end{bmatrix}. \quad \text{(hereinafter "Formula 27")}$$

In some embodiments, for $M = cI_{2d \times 2d}$, where $c \in \mathbb{R}^+$ is a strictly positive scalar constant, it can be shown that all the trajectories of the combined dynamics in Formula 27 converge to the goal location x*. Based on this, all trajectories of the combined dynamics in Formula 27 may converge to the goal location. Thus, for all t, $\dot{x}(t)$ is not equal to zero anywhere in the state space except at the goal location x*. Therefore, in some embodiments, there are no local minima present in the state space and the goal location x* is the global minimum.

In some embodiments, the combined dynamics given by Formula 27 may provide the robot 110 with a combination of two forces, one moving it away from the obstacles and the other toward the goal location.

At block 340, the learning system 100 may generate a trajectory based on the learned NN or GMM along with obstacle avoidance, as described in Formula 26 above.

It can be shown that, where T1(t) is a trajectory of the globally semi-contracting system of Formula 4 and T2(t) is a trajectory of the combined dynamics of Formula 26, the smallest distance, defined by $S(t) \triangleq \int_{T_1}^{T_2} \|\delta x\|$, between T1(t) and T2(t) satisfies $$S(t) \le S(t_0) e^{-\gamma_1 (t - t_0)} + \frac{1 - e^{-\gamma_1 (t - t_0)}}{\gamma_1} sup_{x,t} \|d\| \forall t \ge t_0, \quad \text{(hereinafter "Formula 28")}$$

and as $$t \to \infty,\ S(t) \le sup_{x,t} \frac{\|d\|}{\gamma_1},\ \text{where } d(x(t)) = -\Sigma_i \nabla_x V_{ri}(x)$$

for $i = \{1, \ldots, n_0\}$. Thus, in some embodiments, there exists an upper bound on the distance between the trajectory of the learned contracting model and the trajectory of the combined dynamics (i.e., the learned contracting model using an obstacle avoidance approach described herein). As a result, addition of the obstacle avoidance need not lead to the trajectory to monotonically diverge away from the trajectory of the original learned contracting model.

A proof of this involves the following. Differentiating the distance S(t) yields the differential inequality $\dot{S} \leq -\gamma S + \|d\|$, whose solution is given by S(t). Let $\overline{S}(t)$ be the solution to the differential equation $\dot{\overline{S}} = -\gamma \overline{S} + \|d\|$. The trajectory $\overline{S}(t)$ is given by $\overline{S}(t) = \overline{S}(t_0) e^{-\gamma_1 (t - t_0)} + \int_{t_0}^{t} e^{-\gamma_1 (t - \tau)} \|d(x(t))\| d\tau$. Based on Khalil's comparison lemma, $S(t) \leq \overline{S}(t)$, which implies $S(t) \leq \overline{S}(t_0) e^{-\gamma_1 (t - t_0)} + \int_{t_0}^{t} e^{-\gamma_1 (t - \tau)} \|d(x(t)\| d\tau$ (hereinafter "Formula 29"). Taking the supremum of $\|d(x(t))\|$ out of the integral in Formula 29 results in Formula 28. As $t \rightarrow \infty$, the exponential terms decay and the bound is given by $$S(t) \leq sup_{x,t} \frac{\|d\|}{\gamma_1}.$$

Blocks 330-340 above may be performed by the trajectory generation unit 140 of the learning system 100. At block 350, the learning system 100 may convert the trajectory generated above from the Cartesian space into a trajectory in the joint space of the robot 110. In some embodiments, this may be executed through the use of IKFast, a robot kinematics solver, or by some other solver. At block 360, the learning system 100 may implement the trajectory, such as by using a low-level joint controller to control the robot 110 according to the trajectory in joint space. Black 350-360 may be performed by the motion planning unit 150 of the learning system 100. At block 370, the method 300 may exit, with the robot 110 having performed the task through moving according to the joint-space trajectory.

It will be understood by one skilled in the art that various implementations of the learning system 100 and the robot 110 may be used. For example, in one embodiment, the demonstrations may each include a human subject reaching for a target location to pick up an object, and data describing these demonstrations may be collected using a Microsoft® Kinect® for Windows®. The learning system 100 may be implemented on a desktop computer running an Intel® i3 processor and having 8 GBs of memory. The methods described above may be coded on the desktop computer using Matlab 2014a. The learning system 100 on the desktop computer may be used to control a robot 110, such as a Baxter robot, whose hand position in 3D Cartesian space is considered to be the state. Velocity estimates of the hand may be estimated from position measurements of the hand using a Kalman filter. There may be six neurons in the hidden layer of the NN, and the NN weights or the GMM parameters of the constrained optimization algorithm may be initialized to weights or parameters obtained by learning the NN or GMM without the constraints. In the case of the NN, the identity matrix may be used as the metric M. In the case of the GMM, the parameters of the state-dependent contraction metric may be learned from the one or more demonstrations. Matlab's fmincon function may be used to solve the optimization problem. The implementation on the robot may be achieved through IKFast to convert the resulting trajectory into a trajectory in the joint space of the robot.

Technical effects and benefits of some embodiments include the ability to learn a semi-contracting dynamic motion model in a state space is presented. The learned model may be used to generate motion trajectories of a robot based on human demonstrations. Through a CDSP, some embodiments of the learning system 100 may combine the advantages of global stability with a NN model or a GMM. In some embodiments, obstacle avoidance and motion planning may be incorporated. The global semi-contracting nature of the dynamics may make the goal location globally attractive, thus causing the dynamics to be robust to perturbations and sensor faults. Further, some embodiments of the learning system 100 may be platform-agnostic and thus compatible with various types of robots 110, including robots 110 from various manufacturers.

Figure 4:
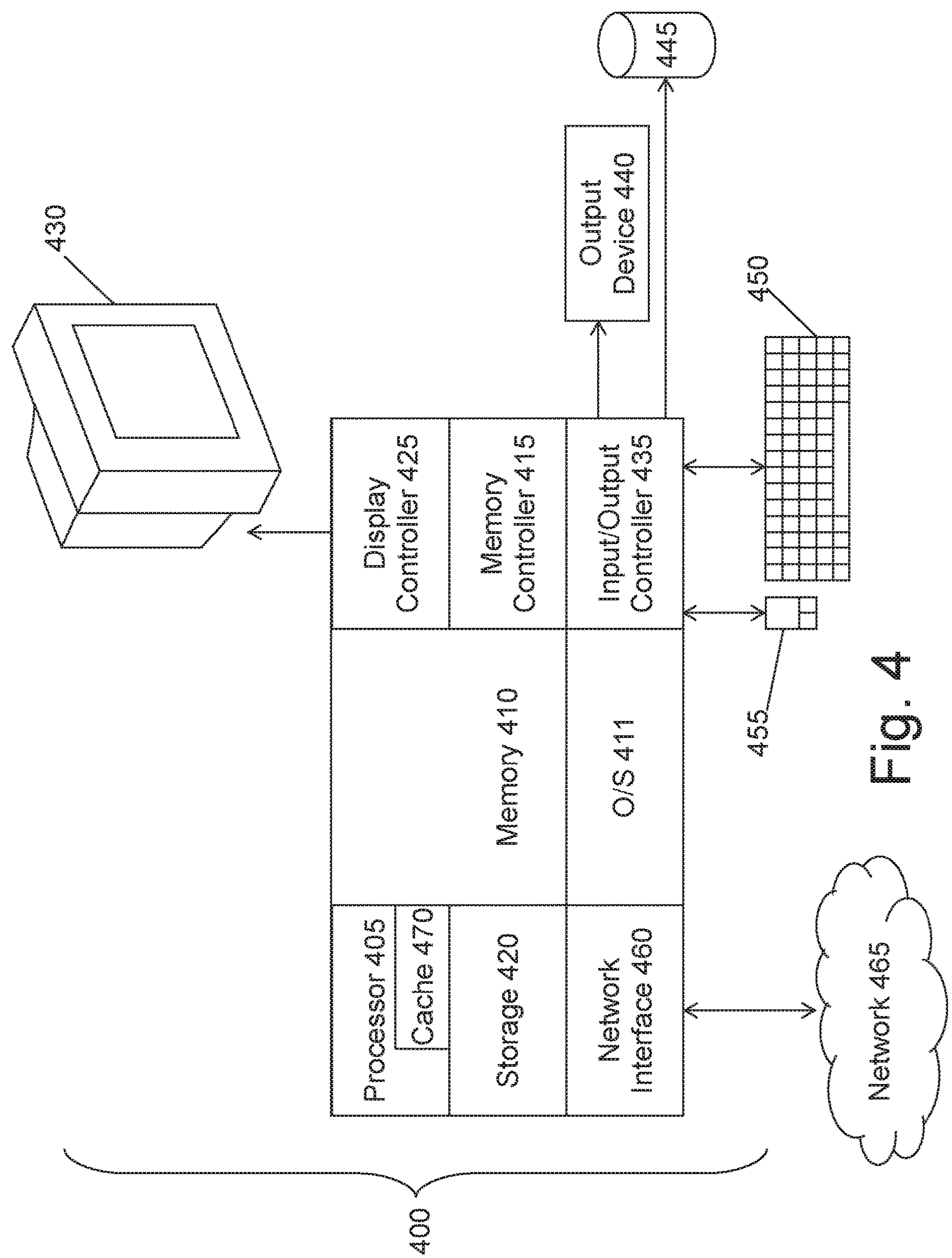
FIG. 4 is a block diagram of a computer system for implementing some or all aspects of the learning system, according to one or more embodiments of this disclosure.

FIG. 4 illustrates a block diagram of a computer system 400 for use in implementing a learning system 100 or method according to some embodiments. The learning systems 100 and methods described herein may be implemented in hardware, software (e.g., firmware), or a combination thereof. In some embodiments, the methods described may be implemented, at least in part, in hardware and may be part of the microprocessor of a special or general-purpose computer system 400, such as a personal computer, workstation, minicomputer, or mainframe computer. For instance, as described above, the learning system 100 may be implemented on a desktop computer in communication with the robot 110.

In some embodiments, as shown in FIG. 4, the computer system 400 includes a processor 405, memory 410 coupled to a memory controller 415, and one or more input devices 445 and/or output devices 440, such as peripherals, that are communicatively coupled via a local I/O controller 435. These devices 440 and 445 may include, for example, a printer, a scanner, a microphone, and the like. Input devices such as a conventional keyboard 450 and mouse 455 may be coupled to the I/O controller 435. The I/O controller 435 may be, for example, one or more buses or other wired or wireless connections, as are known in the art. The I/O controller 435 may have additional elements, which are omitted for simplicity, such as controllers, buffers (caches), drivers, repeaters, and receivers, to enable communications.

The I/O devices 440, 445 may further include devices that communicate both inputs and outputs, for instance disk and tape storage, a network interface card (NIC) or modulator/demodulator (for accessing other files, devices, systems, or a network), a radio frequency (RF) or other transceiver, a telephonic interface, a bridge, a router, and the like.

The processor 405 is a hardware device for executing hardware instructions or software, particularly those stored in memory 410. The processor 405 may be a custom made or commercially available processor, a central processing unit (CPU), an auxiliary processor among several processors associated with the computer system 400, a semiconductor based microprocessor (in the form of a microchip or chip set), a microprocessor, or other device for executing instructions. The processor 405 includes a cache 470, which may include, but is not limited to, an instruction cache to speed up executable instruction fetch, a data cache to speed up data fetch and store, and a translation lookaside buffer (TLB) used to speed up virtual-to-physical address translation for both executable instructions and data. The cache 470 may be organized as a hierarchy of more cache levels (L1, L2, etc.).

The memory 410 may include one or combinations of volatile memory elements (e.g., random access memory, RAM, such as DRAM, SRAM, SDRAM, etc.) and nonvolatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 410 may incorporate electronic, magnetic, optical, or other types of storage media. Note that the memory 410 may have a distributed architecture, where various components are situated remote from one another but may be accessed by the processor 405.

The instructions in memory 410 may include one or more separate programs, each of which comprises an ordered listing of executable instructions for implementing logical functions. In the example of FIG. 4, the instructions in the memory 410 include a suitable operating system (OS) 411. The operating system 411 essentially may control the execution of other computer programs and provides scheduling, input-output control, file and data management, memory management, and communication control and related services.

Additional data, including, for example, instructions for the processor 405 or other retrievable information, may be stored in storage 420, which may be a storage device such as a hard disk drive or solid state drive. The stored instructions in memory 410 or in storage 420 may include those enabling the processor to execute one or more aspects of the learning systems 100 and methods of this disclosure.

The computer system 400 may further include a display controller 425 coupled to a display 430. In some embodiments, the computer system 400 may further include a network interface 460 for coupling to a network 465. The network 465 may be an IP-based network for communication between the computer system 400 and an external server, client and the like via a broadband connection. The network 465 transmits and receives data between the computer system 400 and external systems. In some embodiments, the network 465 may be a managed IP network administered by a service provider. The network 465 may be implemented in a wireless fashion, e.g., using wireless protocols and technologies, such as WiFi, WiMax, etc. The network 465 may also be a packet-switched network such as a local area network, wide area network, metropolitan area network, the Internet, or other similar type of network environment. The network 465 may be a fixed wireless network, a wireless local area network (LAN), a wireless wide area network (WAN) a personal area network (PAN), a virtual private network (VPN), intranet or other suitable network system and may include equipment for receiving and transmitting signals.

Learning systems 100 and methods according to this disclosure may be embodied, in whole or in part, in computer program products or in computer systems 400, such as that illustrated in FIG. 4.

What is claimed is:

1. A computer-implemented method comprising:

recording one or more demonstrations of a task performed by a user;

determining, based on the one or more demonstrations, movements of one or more joints of the user;

training, based on the movements of the one or more joints of the user, a model, the model utilized to generate motion trajectories of a robot based on human demonstrations, by:

defining parameters of a neural network or Gaussian mixture model and obtaining weights of the neural network or Gaussian mixture model, bounded by motion trajectory constraints such that the model exponentially converges to a single trajectory or single point according to a contraction analysis;

the motion trajectory constraints representing motion characteristics of the task, wherein the contraction analysis is applied to analyze exponential stability of a non-linear, autonomous/non-autonomous system, modeled using neural network or Gaussian mixture model under contraction conditions of underlying dynamics modeled utilizing neural network or Gaussian mixture model, to determine if the system is semi-contracting, partially contracting, globally contracting, for generating converging trajectories and causing the robot to execute the motion trajectories;

determining a first initial position of a robot;

determining a first trajectory of the robot to perform the task, the determining based at least in part on the model and the first initial position; and causing the robot to change position based on the first trajectory, wherein training the model by obtaining the weights that define the motion trajectory constraints comprises:

initializing the neural network having an output by solving an optimization problem to generate one or more weights of the neural network;

generating an updated optimization problem based on the optimization problem and the motion trajectory constraints; and updating the neural network by solving the updated optimization problem such that the output corresponds to the weights bounded by the motion trajectory constraints;

the method further comprising:

defining a size of a domain of influence for an object in a workspace of the robot; and generating a second trajectory for performing the task, based at least in part on the model, the first initial position, and the size of the domain of influence of the object;

wherein the second trajectory avoids the object, and wherein the first trajectory and the second trajectory converge to a common goal location, and wherein the second trajectory does not monotonically diverge from the first trajectory.

2. The computer-implemented method of claim 1, further comprising:

determining a second initial position of the robot for performing the task, wherein the first initial position differs from the second initial position; and determining a second trajectory of the robot to perform the task, based at least in part on the model and the second initial position;

wherein the first trajectory of the robot and the second trajectory of the robot converge to a common goal location.

3. The computer-implemented method of claim 1, wherein training the model by defining the weights that define the motion trajectory constraints comprises:

initializing the neural network having an output by solving an optimization problem to generate one or more weights of the neural network;

generating an updated optimization problem based on the optimization problem and the motion trajectory constraints; and updating the neural network by solving the updated optimization problem such that the output corresponds to the weights bounded by the motion trajectory constraints.

4. The computer-implemented method of claim 1, further comprising:

defining a size of a domain of influence for an object in a workspace of the robot; and generating a second trajectory for performing the task, based at least in part on the model, the first initial position, and the size of the domain of influence of the object;

wherein the second trajectory avoids the object.

5. A system comprising:

a memory having computer readable instructions; and one or more processors for executing the computer readable instructions, the computer readable instructions configured, upon execution by the one or more processors, to cause the one or more processors to:

record one or more demonstrations of a task performed by a user;

determine, based on the one or more demonstrations, movements of one or more joints of the user;

train, based on the movements, a model, the model utilized to generate motion trajectories of a robot based on human demonstrations, by:

defining parameters of a neural network or Gaussian mixture model and obtaining weights of the neural network or Gaussian mixture model, bounded by motion trajectory constraints such that the learning model exponentially converges to a single trajectory or single point according to a contraction analysis, the motion trajectory constraints representing motion characteristics of the task, wherein the model is the Gaussian mixture model, wherein the contraction analysis is applied to analyze exponential stability of a non-linear, autonomous/non-autonomous system, modeled using neural network or Gaussian mixture model under contraction conditions of underlying dynamics modeled utilizing neural network or Gaussian mixture model, to determine if the system is semi-contracting partially contracting, globally contracting, for generating converging trajectories and causing the robot to execute the motion trajectories;

determine a first initial position of a robot;

determine a first trajectory of the robot to perform the task, the determining based at least in part on the model and the first initial position; and cause, by the system, the robot to change at least position or velocity based on the first trajectory;

wherein the computer readable instructions are further configured upon execution by the one or more processors to cause the one or more processors to:

define a size of a domain of influence for an object in a workspace of the robot; and generate a second trajectory for performing the task, based at least in part on the model, the first initial position, and the size of the domain of influence of the object, wherein the second trajectory avoids the object, and wherein the first trajectory and the second trajectory converge to a common goal location, and wherein the second trajectory does not monotonically diverge from the first trajectory.

6. The system of claim 5, the computer readable instructions further comprising:

determining a second initial position of the robot for performing the task, wherein the first initial position differs from the second initial position; and determining a second trajectory of the robot to perform the task, based at least in part on the model and the second initial position;

wherein the first trajectory of the robot and the second trajectory of the robot converge to a common goal location.

7. The system of claim 5, wherein training the model incorporating the motion trajectory constraints comprises:

initializing the Gaussian mixture model having an output by solving an optimization problem to generate the parameters of the Gaussian mixture model;

generating an updated optimization problem based on the optimization problem and the motion trajectory constraints; and updating the Gaussian mixture model by solving the updated optimization problem.

8. The system of claim 5, the computer readable instructions further comprising:

defining a size of a domain of influence for an object in a workspace of the robot; and generating a second trajectory for performing the task, based at least in part on the model, the first initial position, and the size of the domain of influence of the object;

wherein the second trajectory avoids the object.

9. A computer program product for a robot having one or more processors, the computer program product comprising:

a non-transitory computer readable storage medium;

program instructions embodied on the non-transitory computer readable storage medium, the program instructions configured, upon execution by the one or more processors, to cause the robot to change a position based on a first trajectory associated with performance of a task from a first initial position, the first trajectory being defined by a model, the model utilized to generate motion trajectories of the robot based on human demonstrations, the model having designed parameters of a neural network or Gaussian mixture model and obtained weights of the neural network or Gaussian mixture model, bounded by motion trajectory constraints having an exponential convergence to a single trajectory or single point according to a contraction analysis, the motion trajectory constraints representing motion characteristics of the task, wherein the contraction analysis is applied to analyze exponential stability of a non-linear, autonomous/non-autonomous system, modeled using neural network or Gaussian mixture model under contraction conditions of underlying dynamics modeled utilizing neural network or Gaussian mixture model, to determine if the system is semi-contracting, partially contracting, globally contracting, for generating converging trajectories and causing the robot to execute the motion trajectories;

wherein the computer readable instructions are further configured, upon execution by the one or more processors, to cause the one or more processors to:

define a size of a domain of influence for an object in a workspace of the robot; and generate a second trajectory for performing the task, based at least in part on the model, the first initial position, and the size of the domain of influence of the object;

wherein the second trajectory avoids the object, and wherein the first trajectory and the second trajectory converge to a common goal location, and wherein the second trajectory does not monotonically diverge from the first trajectory.

10. The computer program product of claim 9, wherein the program instructions are further configured, upon execution, to cause the robot to:

determine a second initial position of the robot for performing the task, wherein the first initial position differs from the second initial position; and determine a second trajectory of the robot to perform the task, based at least in part on the model and the second initial position;

wherein the first trajectory of the robot and the second trajectory of the robot converge to a common goal location.

11. The computer program product of claim 9, wherein the wherein the weights are obtained upon execution by the one or more processors to:

initialize the neural network having an output by solving an optimization problem to generate one or more parameters of the neural network;

generate an updated optimization problem based on the optimization problem and the motion trajectory constraints; and update the neural network by solving the updated optimization problem such that the output corresponds to the parameters bounded by the motion trajectory constraints.

12. The computer program product of claim 9, wherein the first trajectory is in a joint space of the robot.

13. The computer program product of claim 9, wherein the second trajectory has a smallest distance with respect to the first trajectory on a manifold that is minimized according to the learned model.

14. The computer program product of claim 13, wherein the smallest distance is defined by $S(t) \triangleq \int_{T_1}^{T_2} \|\delta x\|$, between trajectories T1(t) and T2(t).

15. The system of claim 5, wherein the Gaussian mixture model is based on an activation function that is bounded by zero and 0.25.

16. The computer program product of claim 9, wherein the learned model is based on an activation function that is bounded by zero and 0.25.

17. The computer program product of claim 9, wherein the weights are upper bounded by $U_x[\Sigma'(U^T s)]^T WM + MW^T [\Sigma'(U^T s)] U_x^T \leq 0$.

18. The computer program product of claim 9, wherein the weights are lower bounded as $U_x[\Sigma'(U^T s)]^T WM + MW^T [\Sigma'(U^T s)] U_x^T \leq 0.25[U_x WM] + 0.25[MW^T U_x^T]$.

* * * * *